(12) United States Patent
Kwon et al.

(10) Patent No.: US 12,552,393 B2
(45) Date of Patent: Feb. 17, 2026

(54) METHOD AND APPARATUS FOR INFERRING DRIVING CHARACTERISTIC OF A VEHICLE IN REAL-TIME

(71) Applicant: FOUNDATION OF SOONGSIL UNIVERSITY-INDUSTRY COOPERATION, Seoul (KR)

(72) Inventors: Minhae Kwon, Seoul (KR); Dong Su Lee, Seoul (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 203 days.

(21) Appl. No.: 18/139,602

(22) Filed: Apr. 26, 2023

(65) Prior Publication Data

US 2024/0239350 A1    Jul. 18, 2024

(30) Foreign Application Priority Data

Jan. 17, 2023   (KR) .................. 10-2023-0006690

(51) Int. Cl.
*B60W 40/09* (2012.01)
*B60W 60/00* (2020.01)

(52) U.S. Cl.
CPC .......... *B60W 40/09* (2013.01); *B60W 60/001* (2020.02); *B60W 2554/80* (2020.02); *B60W 2556/45* (2020.02)

(58) Field of Classification Search
CPC .............. B60W 40/09; B60W 60/001; B60W 2556/45; B60W 2554/80
See application file for complete search history.

(56) References Cited

U.S. PATENT DOCUMENTS

| | | | |
|---|---|---|---|
| 2020/0175691 A1 | 6/2020 | Zhang et al. | |
| 2020/0249674 A1* | 8/2020 | Dally | G05D 1/0221 |
| 2021/0048815 A1* | 2/2021 | McErlean | B60W 50/14 |
| 2021/0179118 A1 | 6/2021 | Alt et al. | |
| 2023/0219569 A1* | 7/2023 | Zhao | B60W 60/001 701/23 |
| 2024/0092400 A1* | 3/2024 | Maniwa | G06V 10/26 |
| 2024/0095527 A1* | 3/2024 | Handa | G06N 3/084 |
| 2024/0239350 A1* | 7/2024 | Kwon | B60W 60/001 |
| 2024/0242596 A1* | 7/2024 | Kwon | G08G 1/096725 |
| 2025/0077943 A1* | 3/2025 | Kwon | G06N 5/043 |

FOREIGN PATENT DOCUMENTS

| | | |
|---|---|---|
| JP | 2022-175160 A | 11/2022 |
| KR | 10-2021-0089469 A | 7/2021 |

* cited by examiner

*Primary Examiner* — Peter D Nolan
*Assistant Examiner* — Wae L Louie
(74) *Attorney, Agent, or Firm* — Bridgeway IP Law Group, PLLC; Sang Ho Lee; Hyun Woo Shin (57) ABSTRACT

Provided is a method and an apparatus of inferring a stochastic driving characteristic of a driving vehicle. The driving characteristic inferring apparatus may include a model training unit which trains a plural driving characteristic model and an inference model using learning driving data of a learning driving vehicle, and a driving characteristic inferring unit which infers a driving characteristic coefficient representing a driving characteristic of a target driving vehicle with driving data of the target driving vehicle as an input of the inference model.

12 Claims, 8 Drawing Sheets

| Algorithm | Inference Accuracy | | | Time Complexity | Algorithm | Inference Accuracy | Time Complexity |
|---|---|---|---|---|---|---|---|
| | l=10 | l=100 | l=200 | | | | |
| Proposed (LSTM) | 0.9564 ±0.0017 | 0.9621 ±0.0007 | 0.9633 ±0.0006 | $O(ld^2)$ | Proposed (Feedforward) | 0.9533 ±0.0019 | $O(d^2)$ |
| IRC | 0.7874 ±0.0883 | 0.9441 ±0.0451 | 0.9604 ±0.0344 | $O(kld^2)$ | VI | 0.8900 ±0.0022 | $O(d^2)$ |

METHOD AND APPARATUS FOR INFERRING DRIVING CHARACTERISTIC OF A VEHICLE IN REAL-TIME

CROSS-REFERENCE TO RELATED APPLICATIONS

This application claims the priority of Korean Patent Application No. 10-2023-0006690 filed on Jan. 17, 2023, in the Korean Intellectual Property Office, the disclosure of which is incorporated herein by reference.

TECHNICAL FIELD

The present disclosure relates to a stochastic driving characteristic inferring method and apparatus for inferring a stochastic driving characteristic of a driving vehicle in real time.

BACKGROUND ART OF INVENTION

Real and artificial intelligence entities may have individual characteristics and make individual decisions based on the characteristics. For example, driving vehicles which are driving on the road may be aggressively or stably driven depending on a style of a driver or an artificial intelligence entity. In such an environment, if a characteristic of a specific entity is understood, the entity's decision-making may be predicted in advance.

In order to realize this, many studies are conducting modeling researches to inversely infer characteristics based on the decision-making and environmental conditions of real and artificial intelligence entities or to assign the characteristics to the artificial intelligence.

However, most of researches which conduct the characteristic modeling of the artificial intelligence are not performed on the individual entities, but performed on the cluster unit and consider only the deterministic characteristics of the entity.

However, according to the results of neuroscience research, it has been reported that individuals show different decision-making patterns under the same environmental conditions and this is because the characteristics of the entities are stochastic.

Accordingly, in order to more accurately predict driving characteristics, a stochastic driving characteristic inferring apparatus with respect to the individual driving vehicle, rather that the cluster unit, is required.

DISCLOSURE OF INVENTION

Technical Problem to Be Solved

An object of the present disclosure is to provide a driving characteristic inferring method and apparatus which may infer a driving characteristic coefficient using a trained inference model and infer the driving characteristic of a target driving vehicle which is an individual object.

Further, an object of the present disclosure is to provide a driving characteristic inferring method and apparatus which may infer not only deterministic driving characteristics of a target driving vehicle, but also stochastic driving characteristics.

The object of the present disclosure is not limited to the above-mentioned objects and other objects and advantages of the present disclosure which have not been mentioned above may be understood by the following description and become more apparent from exemplary embodiments of the present disclosure. Further, it is understood that the objects and advantages of the present disclosure may be embodied by the means and a combination thereof in the claims.

Technical Solution to Solve Problems

A driving characteristic inferring apparatus according to an exemplary embodiment of the present disclosure includes: a model training unit which trains a plural driving characteristic model and an inference model using learning driving data of a learning driving vehicle; and a driving characteristic inferring unit which infers a driving characteristic coefficient representing a driving characteristic of a target driving vehicle with driving data of the target driving vehicle as an input of the inference model, wherein the target driving vehicle is a vehicle that drives within a predetermined distance from the learning driving vehicle, the driving characteristic coefficient is a stochastic driving characteristic coefficient, and the inferred driving characteristic coefficient of the target driving vehicle is used to control the learning driving vehicle.

Further, in an exemplary embodiment of the present disclosure, the model training unit includes a plural driving characteristic model training unit, a dataset generating unit for every driving characteristic, and a real-time inference model training unit, and the plural driving characteristic model training unit trains the plural driving characteristic model using the learning driving data, the dataset generating unit for every driving characteristic generates a dataset for every driving characteristic by means of a plural characteristic model, and the real-time inference model training unit trains the inference model using the generated dataset for every driving characteristic.

Further, in an exemplary embodiment of the present disclosure, the driving characteristic coefficient further includes a deterministic driving characteristic coefficient.

The driving characteristic inferring apparatus according to an exemplary embodiment of the present disclosure further includes: a monitoring unit which collects the learning driving data and the driving data from at least one of a sensing module equipped in the learning driving vehicle and the target driving vehicle and a road side unit (RSU).

Further, in the exemplary embodiment of the present disclosure, the learning driving data includes a speed of the learning driving vehicle, a located lane, a relative distance from a neighboring vehicle, and a relative speed from a neighboring vehicle.

Further, in the exemplary embodiment of the present disclosure, the model training unit trains the plural driving characteristic model using a reward function and the reward function is expressed by a function of linearly combining a product of a plural dependent compensation term and a corresponding driving characteristic coefficient.

Further, in the exemplary embodiment of the present disclosure, the stochastic driving characteristic coefficient is calculated through a method of minimizing the distributional distance between the inferred driving characteristic coefficient and an actual driving characteristic coefficient.

A driving characteristic inferring method according to an exemplary embodiment of the present disclosure includes: training a plural driving characteristic model and an inference model using learning driving data of a learning driving vehicle, by a model training unit; and inferring a driving characteristic coefficient representing a driving characteristic of a target driving vehicle with driving data of the target driving vehicle as an input of the inference model, by a driving characteristic inferring unit, wherein the target driving vehicle is a vehicle that drives within a predetermined distance from the learning driving vehicle, the driving characteristic coefficient is a stochastic driving characteristic coefficient, and the inferred driving characteristic coefficient of the target driving vehicle is used to control the learning driving vehicle.

Further, in the exemplary embodiment of the present disclosure, the model training unit includes a plural driving characteristic model training unit, a dataset generating unit for every driving characteristic, and a real-time inference model training unit, and the training includes a step in which the plural driving characteristic model training unit trains the plural driving characteristic model using the learning driving data, the dataset generating unit for every driving characteristic generates a dataset for every driving characteristic by means of a plural characteristic model, and the real-time inference model training unit trains the inference model using the generated dataset for every driving characteristic. Further, in an exemplary embodiment of the present disclosure, the driving characteristic coefficient further includes a deterministic driving characteristic coefficient.

Further, the driving characteristic inferring method according to an exemplary embodiment of the present disclosure further includes: collecting the learning driving data and the driving data from at least one of a sensing module equipped in the learning driving vehicle and the target driving vehicle and a road side unit (RSU), by a monitoring unit.

Further, in the exemplary embodiment of the present disclosure, the learning driving data includes a speed of the learning driving vehicle, a located lane, a relative distance from a neighboring vehicle, and a relative speed from a neighboring vehicle.

Further, in the exemplary embodiment of the present disclosure, the model training unit trains the plural driving characteristic model using a reward function and the reward function is expressed by a function of linearly combining a product of a plural dependent compensation term and a corresponding driving characteristic coefficient.

Further, in the exemplary embodiment of the present disclosure, the stochastic driving characteristic coefficient is calculated through a method of minimizing the distributional distance between the inferred driving characteristic coefficient and an actual driving characteristic coefficient.

Advantageous Effects of Invention

The driving characteristic inferring method and apparatus according to the exemplary embodiment of the present disclosure may infer a driving characteristic coefficient using a trained inference model, and infer a driving characteristic of the target driving vehicle which is an individual object.

Further, the driving characteristic inferring method and apparatus according to the exemplary embodiment of the present disclosure may infer not only the deterministic driving characteristic, but also the stochastic driving characteristic of the target driving vehicle.

DETAILED DESCRIPTION FOR IMPLEMENTING INVENTION

Since the present invention can make various changes and have various embodiments, specific embodiments will be illustrated in the drawings and described in detail in the detailed description. However, this is not intended to limit the present invention to specific embodiments, and should be understood to include all modifications, equivalents, and substitutes included in the spirit and scope of the present invention. In describing each drawing, reference numerals refer to like elements.

Terms such as first, second, A, or B may be used to describe various components but the components are not limited by the above terms. The above terms are used only to distinguish one component from the other component. For example, without departing from the scope of the present invention, a first component may be referred to as a second component, and similarly, a second component may be referred to as a first component. A term of and/or includes combination of a plurality of related elements or any one of the plurality of related elements.

It should be understood that, when it is described that a component is "connected to" or "accesses" another component, the component may be directly connected to or access the other component or a third component may be present therebetween. In contrast, when it is described that a component is "directly connected to" or "directly accesses" another component, it is understood that no element is present between the element and another element.

Terms used in the present application are used only to describe a specific exemplary embodiment, but are not intended to limit the present invention. A singular form may include a plural form if there is no clearly opposite meaning in the context. In the present application, it should be understood that term "include" or "have" indicates that a feature, a number, a step, an operation, a component, a part or the combination thereof described in the specification is present, but do not exclude a possibility of presence or addition of one or more other features, numbers, steps, operations, components, parts or combinations thereof, in advance.

If it is not contrarily defined, all terms used herein including technological or scientific terms have the same meaning as those generally understood by a person with ordinary skill in the art of the present invention. Terms which are defined in a generally used dictionary should be interpreted to have the same meaning as the meaning in the context of the related art, and are not interpreted as an ideal meaning or excessively formal meanings unless clearly defined in the present application.

In the present disclosure, the driving vehicle includes a learning driving vehicle and a target driving vehicle. The learning driving vehicle refers to a vehicle to be monitored to generate learning driving data, and the target driving vehicle refers to a vehicle to be observed to infer a driving characteristic. The target driving vehicle is a vehicle driving near the learning driving vehicle. Further the target driving vehicle is a vehicle that drives within a predetermined distance from the learning driving vehicle.

Further, learning driving data is learning data used to train the model and the driving data is data to be used to infer the driving characteristic of the target driving vehicle and includes state information and action information of the target driving vehicle.

Hereinafter, an exemplary embodiment of the present invention will be described in detail with reference to the accompanying drawings.

Figure 1:
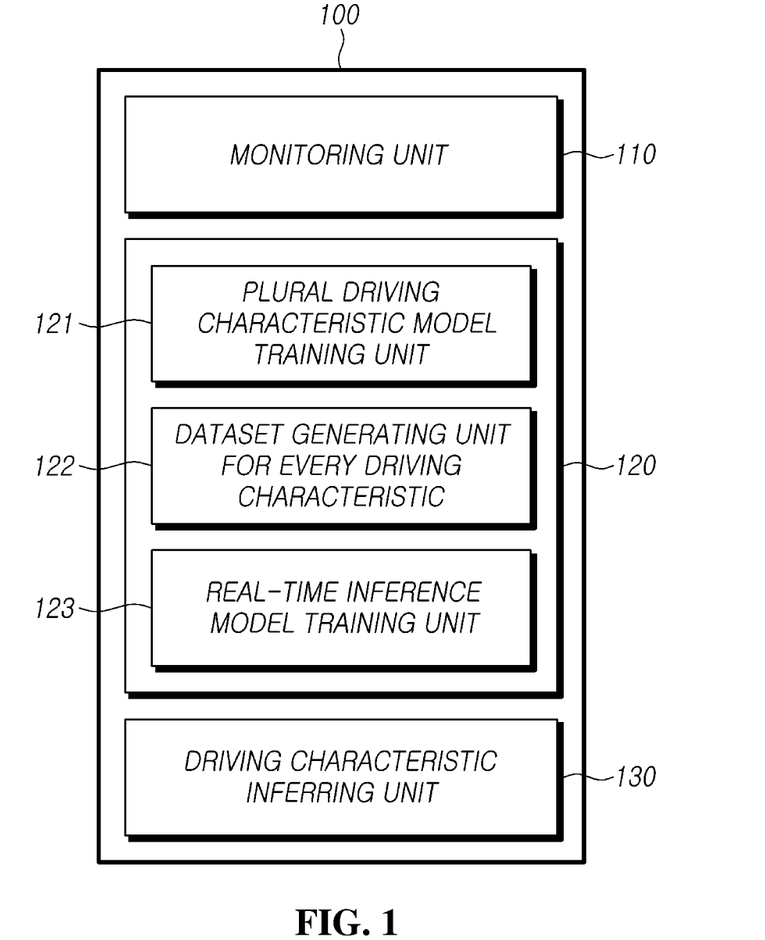
FIG. 1 is a block diagram of a driving characteristic inferring apparatus according to an exemplary embodiment of the present disclosure.
Figure 2:
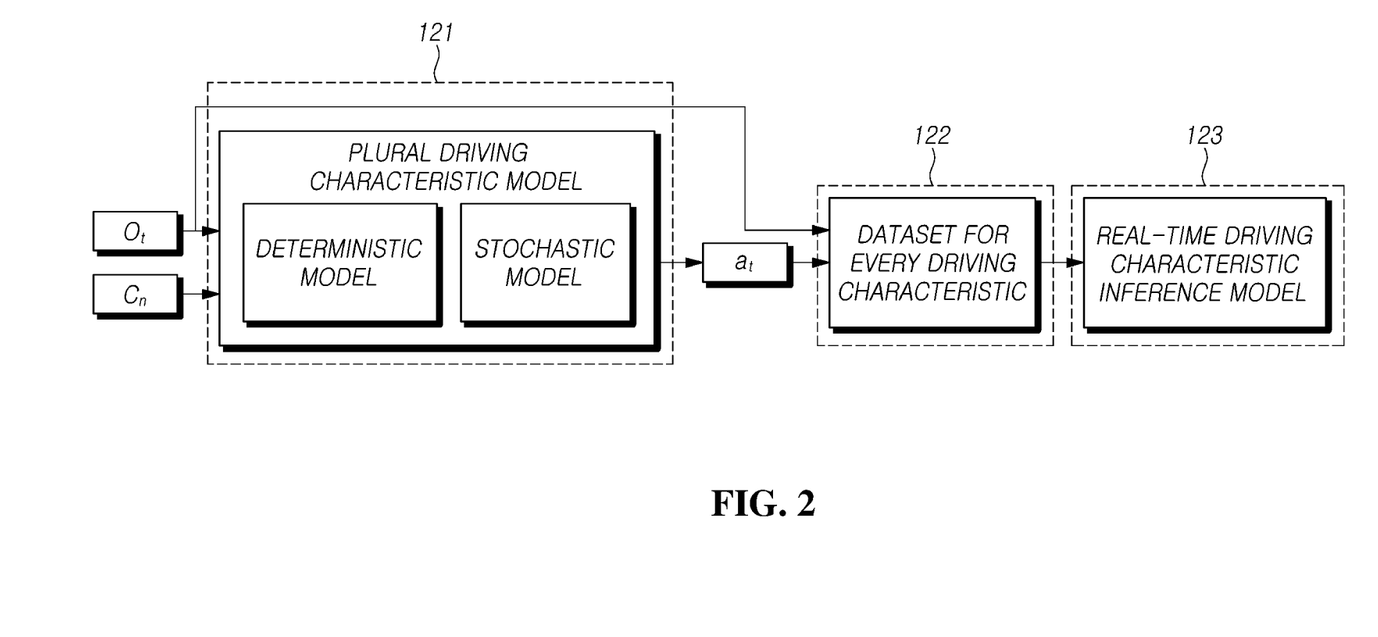
FIG. 2 is a view illustrating a detailed configuration of a driving characteristic inferring apparatus according to an exemplary embodiment of the present disclosure.
Figure 3:
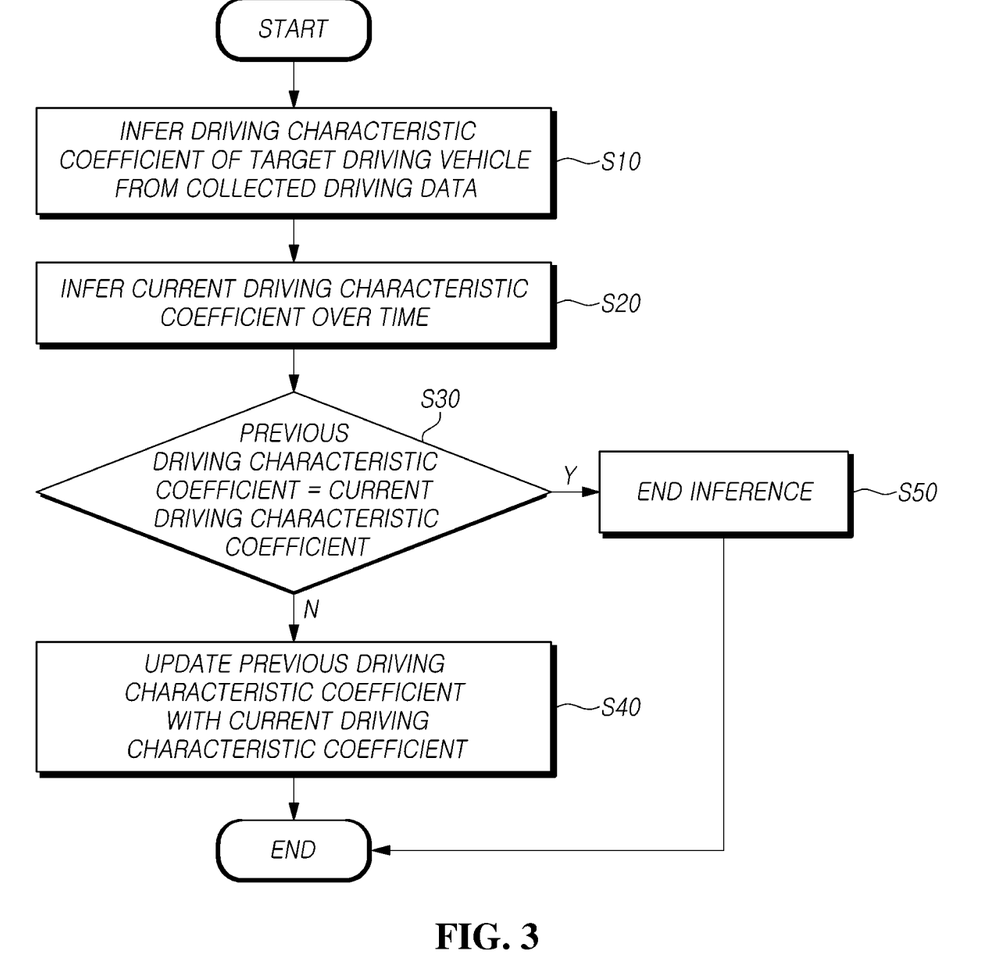
FIG. 3 is a flowchart illustrating an inference flow of an inferring unit in an exemplary embodiment of the present disclosure.
Figure 4A:
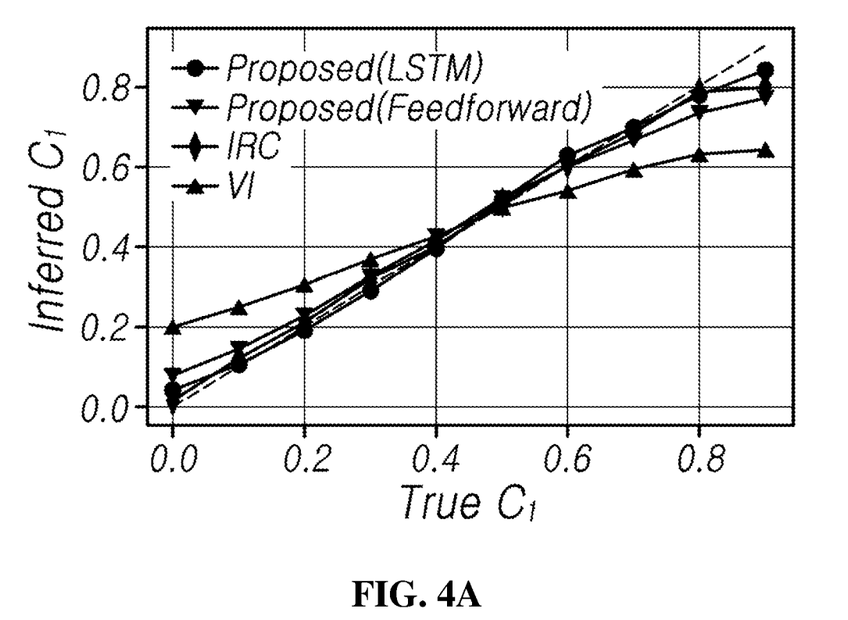
FIG. 4A to 4D are views illustrating an effect of a driving characteristic inferring apparatus according to an exemplary embodiment of the present disclosure.
Figure 4B:
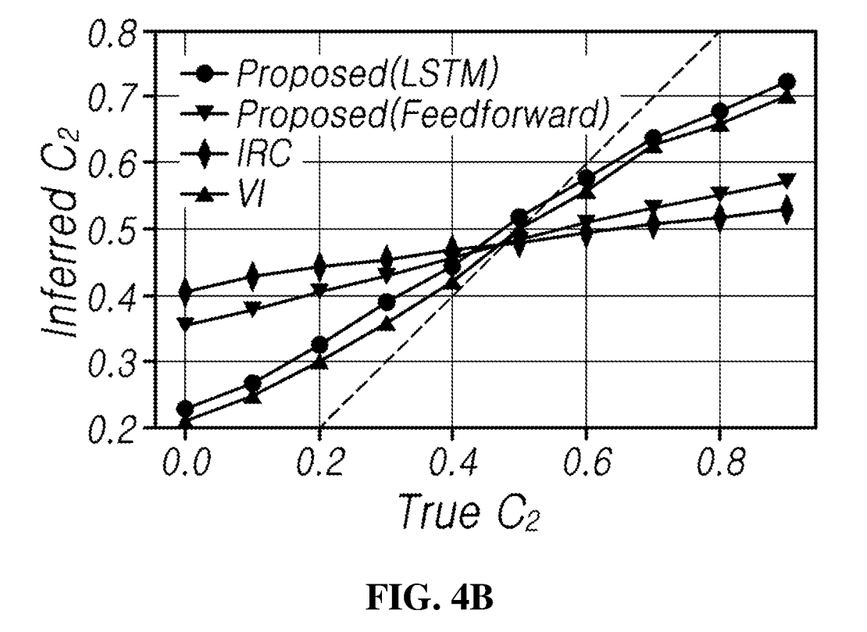
Figure 4C:
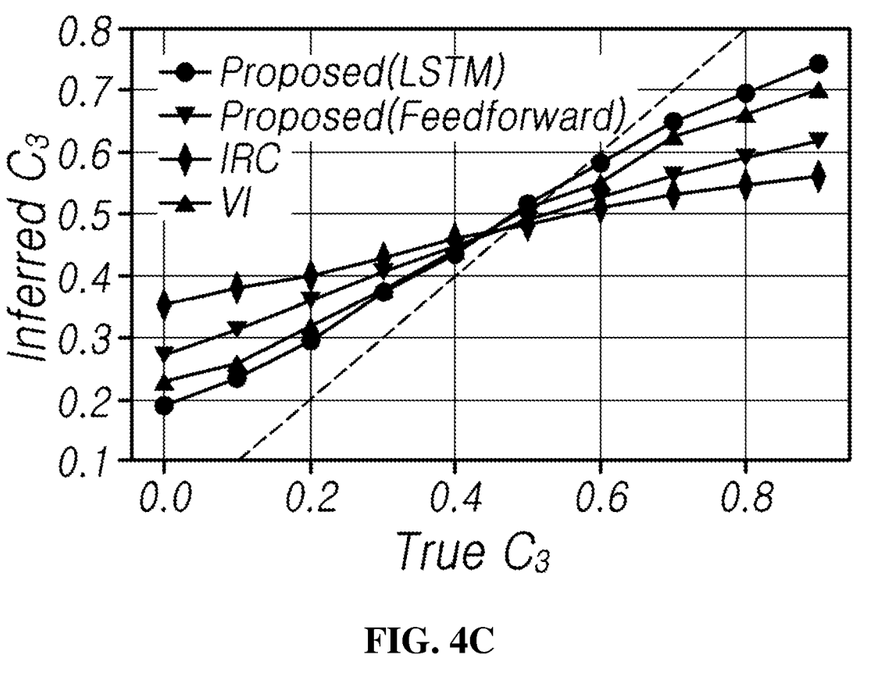
Figure 4D:
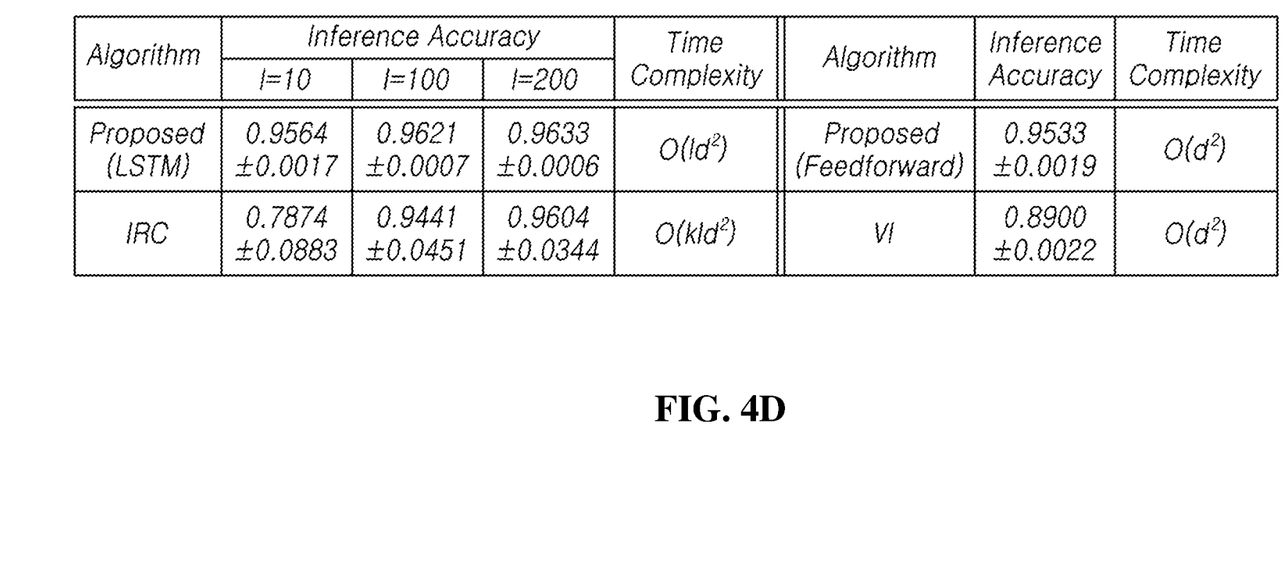

FIG. 1 is a block diagram of a driving characteristic inferring apparatus according to an exemplary embodiment of the present disclosure, FIG. 2 is a view illustrating a detailed configuration of a driving characteristic inferring apparatus according to an exemplary embodiment of the present disclosure, and FIG. 3 is a flowchart illustrating an inference flow of an inferring unit in an exemplary embodiment of the present disclosure. Hereinafter, a driving characteristic inferring apparatus will be described with reference to FIGS. 1 to 3.

A driving characteristic inferring apparatus 100 of the present disclosure is an apparatus which infers a driving characteristic of a target driving vehicle, and includes a monitoring unit 110, a model training unit 120, and a driving characteristic inferring unit 130.

The monitoring unit 110 collects learning driving data and driving data using a sensing module equipped in the driving vehicle or by communicating with a road side unit (RSU), respectively.

The sensing module may be a camera or a LIDAR sensor, and the RSU is configured by a plurality of units to exchange data through wired/wireless communication between units. Communication between the RSU and the driving vehicle may be performed based on vehicle-to-infrastructure (V2I) or vehicle to something (V2X) technologies, but is not necessarily limited thereto.

Information which may be obtained by the communication with the driving vehicle is driving data, and may include state information and action information of the vehicle. Specifically, the state information of the vehicle may include a vehicle speed, a vehicle's located lane, a relative distance between the vehicle and a neighboring vehicle, and a relative speed between the vehicle and the neighboring vehicle. The action information is information regarding a running operation of the vehicle, and may include information related to the lane change and acceleration adjustment.

In the meantime, a vehicle which travels the road does not stay in one place, but constantly moves so that only one RSU unit cannot completely collect driving data of the vehicle due to communication distance restriction. Accordingly, the monitoring unit 110 gathers information while exchanging driving data of the vehicle through the communication between units. The collected and gathered learning driving data is transmitted to the model training unit to be described to train the model, and the driving data is transmitted to the inferring unit to be used for inference.

The model training unit 120 includes a plural driving characteristic model training unit 121, a dataset generating unit 122 for every driving characteristic, and a real-time inference model training unit 123, and trains a plural driving characteristic model and an inference model based on learning driving data of the learning driving vehicle.

That is, the plural driving characteristic model training unit 121 trains the plural driving characteristic model using learning driving data. The dataset generating unit 122 for every driving characteristic generates a dataset for every driving characteristic by means of a plural characteristic model, and the real-time inference model training unit 123 trains the inference model using the generated dataset for every driving characteristic.

Specifically, the plural driving characteristic model training unit 121 trains the plural driving characteristic model based on the deep reinforcement learning method. The plural driving characteristic model understands all previously defined driving characteristics of the vehicle so that the plural driving characteristic model may output a decision making result value corresponding to the input driving characteristic. To be more specific, the plural driving characteristic model training unit 121 applies a reward determined using a reward function to the plural driving characteristic model, and the reward function is expressed by a function of linearly combining a product of a plural dependent compensation term and a corresponding driving characteristic coefficient.

Specifically, the reward function may be expressed by the following Equation 1.

$$r_t = R(o_t, a_t, o_{t+1}; c_\mu, c_\sigma) = \sum_{n=1}^{N} c_n \mathcal{R}_n(o_t, a_t, o_{t+1}) \quad \text{[Equation 1]}$$

Here, $r_t$ is a reward, $R_n$ is an n-th reward term, $O_t$ and $O_{t+1}$ are learning driving data at timings t and t+1, $a_t$ is an action of the driving vehicle at a timing t, $C_n$ is a driving characteristic coefficient which determines a driving characteristic of the vehicle.

At this time, the driving characteristic coefficient $C_n$ may include a stochastic driving characteristic coefficient. Or, the driving characteristic coefficient $C_n$ may further include a deterministic driving characteristic coefficient, and the stochastic driving characteristic coefficient may be expressed by the following Equation 2.

$$c_n \sim f(c_n; c_{n,\mu}, c_{n,\sigma}, a, b) \quad \text{[Equation 2]}$$

Here, $C_{n,\mu}$ and $C_{n,\sigma}$ refer to a mean and a variance of the distribution for the n-th driving characteristic, and a and b refer to the boundary values of the truncated Gaussian distribution.

That is, the stochastic driving characteristic coefficient is sampled from the truncated Gaussian distribution f( ) which is a driving characteristic distribution and may be expressed by $C_\mu$ and $C_\sigma$ which are the mean and the standard deviation. Here, when boundary values a and b converge to positive and negative limits, respectively, f( ) may be defined as a normal Gaussian distribution.

Further, the deterministic driving characteristic coefficient may be expressed by the following Equation 3.

$$c_n \sim f(c_n; c_{n,\mu}, c_{n,\sigma}, a, b) = \delta(c - c_\mu^*) \quad \text{[Equation 3]}$$

At this time, the deterministic driving characteristic coefficient may be expressed by C which is a fixed value.

As described above, the plural driving characteristic model may be trained so that the action of the trained entity is changed in accordance with the change of the reward. That is, according to the training of the plural driving characteristic model by the reward, different decision making results may be output for the same input from each other. That is, as illustrated in FIG. 2, when the learning driving data $O_r$ and the driving characteristic coefficient $C_n$ which are observation data collected from the monitoring unit 110 are input to the plural driving characteristic model 121, a decision making result at including action information corresponding thereto is output. The dataset generating unit 122 for every driving characteristic may generate a dataset for every driving characteristic based on all driving characteristics which are a pair of the decision making result at output for training the inference model and learning driving data $O_r$. The real-time inference model training unit 123 trains the driving characteristic inference model in real-time using the generated dataset for every driving characteristic. The inference model may have a recurrent neural network structure that may be consistently updated by reflecting a temporal characteristic of the route, and specifically, the inference model may include an LSTM network and a dense layer.

As described above, the inference model is trained for the driving route feature for every driving characteristic with a dataset for every driving characteristic as an input, and infers the driving characteristic coefficient through the LSTM network and the dense layer. Here, the inferred stochastic driving characteristic coefficients are output as $\hat{C}_\mu$, $\hat{C}_\sigma$, and the inferred deterministic driving characteristic coefficient is output as $\hat{C}_\mu$.

Further, the inference model is trained by a loss function which compares the inferred driving characteristic and the actual driving characteristic, and to be more specific, a mean squared error (MSE) is used as a loss function for the deterministic driving characteristic, and a KL divergence is used as a loss function for the stochastic driving characteristic.

The stochastic driving characteristic coefficient may be calculated through a method of minimizing the distributional distance between the inferred driving characteristic coefficient and the actual driving characteristic coefficient.

Specifically, the stochastic driving characteristic coefficient may be calculated to minimize the loss function through Equation 4 which is a KL divergence loss function as follows.

$$\hat{c}_\mu, \hat{c}_\sigma = \underset{c_\mu, c_\sigma}{\arg\min} \mathcal{L}(c_\mu, c_\sigma) \qquad [\text{Equation 4}]$$
$$= \underset{c_\mu, c_\sigma}{\arg\min} - \int f(c; c_\mu^*, c_\sigma^*, a, b) \ln f(c; c_\mu, c_\sigma, a, b) dc.$$

Here, $\hat{C}_\mu$, $\hat{C}_\sigma$ refer to the inferred stochastic driving characteristic coefficients, $L(C_\mu, C_\sigma)$ refers to a loss function for the driving characteristic distribution, $C^*_\mu$, $C^*_\sigma$, refer to actual stochastic driving characteristic distributions, $C_\mu$, $C_\sigma$ refer to the inferred stochastic driving characteristic distributions, f( ) is a truncated Gaussian distribution which is the stochastic driving characteristic distribution, and a and b refer to boundary values of the truncated Gaussian distribution (a is a lower bound and b is an upper bound). Here, when boundary values a and b converge to positive and negative limits, respectively, f( ) may be defined as a normal Gaussian distribution.

Further, the deterministic driving characteristic coefficient may be calculated to minimize the loss function through Equation 5 of mean squared error (MSE).

$$\hat{c}_\mu = \underset{c_\mu}{\arg\min} \frac{1}{N} \sum_{n=1}^{N} (c_{n,\mu}^* - c_{n,\mu})^2 \qquad [\text{Equation 5}]$$

Here, $\hat{C}_\mu$ is an inferred deterministic driving characteristic coefficient, $C^*_{n,\mu}$ is actual deterministic driving characteristic information, and $C_{n,\mu}$ is inferred deterministic driving characteristic information.

The driving characteristic inferring unit 130 infers a driving characteristic coefficient with driving data of the target driving vehicle as an input of the inference model. That is, the driving characteristic inferring unit 130 infers the driving characteristic coefficient using the inference model trained by the model training unit 120 to infer the driving characteristic of the target driving vehicle which is an individual object.

Here, the driving data may include state information and the action information of the target driving vehicle, and may be observation result data of the target driving vehicle collected in the monitoring unit 110 through the communication between the target driving vehicle and the RSU.

In the meantime, the driving characteristic inferring unit 130 may update the driving characteristic according to a predetermined cycle.

Referring to FIG. 3, the driving characteristic inferring unit 130, first of all, infers a driving characteristic coefficient of a target driving vehicle from driving data through the inference model as in S10. Next, the driving characteristic inferring unit 130 infers the current driving characteristic coefficient based on additional driving data collected over time as in S20, and repeatedly updates a previous driving characteristic coefficient with the current driving characteristic coefficient.

At this time, before updating, the driving characteristic inferring unit 130 compares a current driving characteristic to be updated and a previous driving characteristic coefficient before being updated as in S30. The driving characteristic inferring unit 130 performs an update if the current driving characteristic coefficient is different from the previous driving characteristic coefficient as in S40, and does not perform an update and ends the inference if the current driving characteristic coefficient is equal to the previous driving characteristic coefficient as in S50.

In other words, if the current driving characteristic coefficient is equal to the pervious driving characteristic coefficient, the driving characteristic inferring unit 130 determines that the driving characteristic coefficient converged to the final driving characteristic coefficient to finish the inference without performing the update anymore.

As described above, the driving characteristic inferring apparatus 100 of the present disclosure may perform the analysis by reflecting information of time-series data which varies over time, as well as a single datum at a specific time to perform more accurate inference.

The inferred driving characteristic coefficient of the target driving vehicle may be used to control the learning driving vehicle.

FIG. 4A to 4D are views illustrating an effect of a driving characteristic inferring apparatus according to an exemplary embodiment of the present disclosure.

Referring to the drawing, the driving characteristic inferring apparatus of the present disclosure may include LSTM which may analyze the time-series data and Feedforward which analyzes a single datum. Here, "l" refers to a length of time-series data, and as shown in Table, as compared with the IRC and VI inference models which are the related art, the inference accuracy is improved in all inference models of the present specification using LSTM and Feedforward.

Specifically, it may be confirmed that, as compared with the related art, in the case of a single datum (Feedforward), the performance is improved by approximately 7%, and in the case of using 10 sequences (LSTM, l=10), the performance is improved by approximately 21%.

Figure 5:
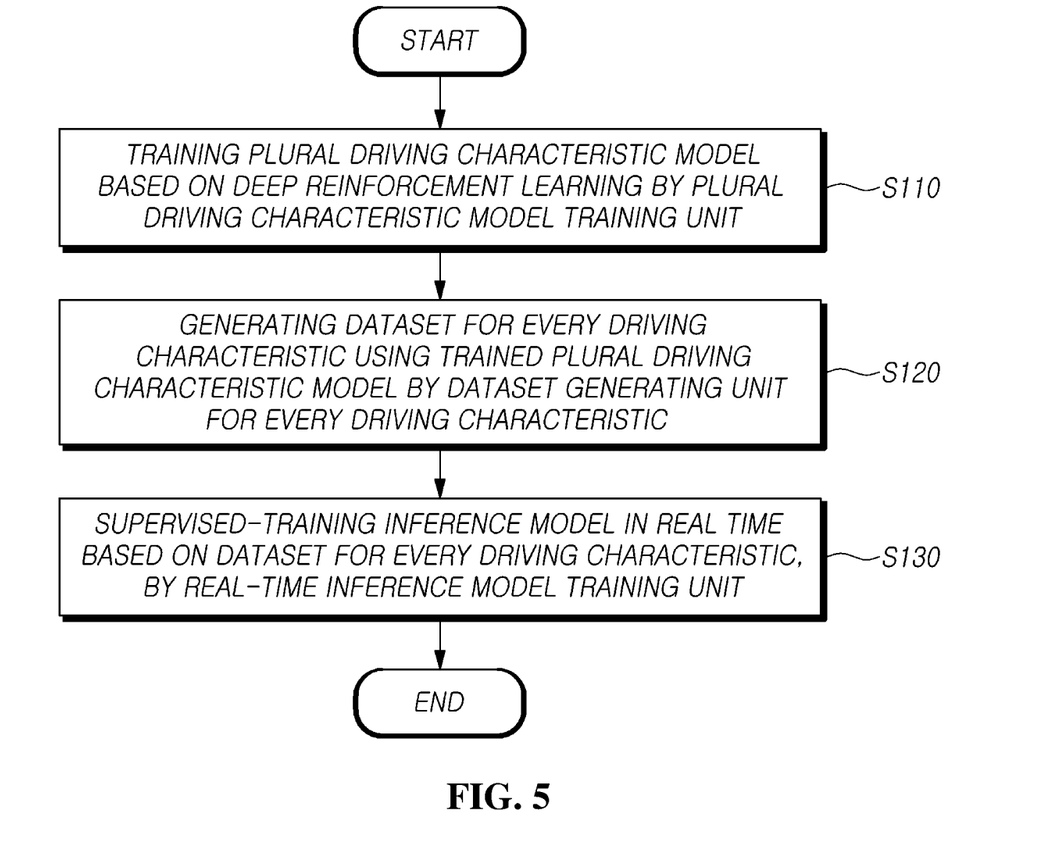
FIG. 5 is a flowchart for model training in an exemplary embodiment of the present disclosure.
Figure 6:
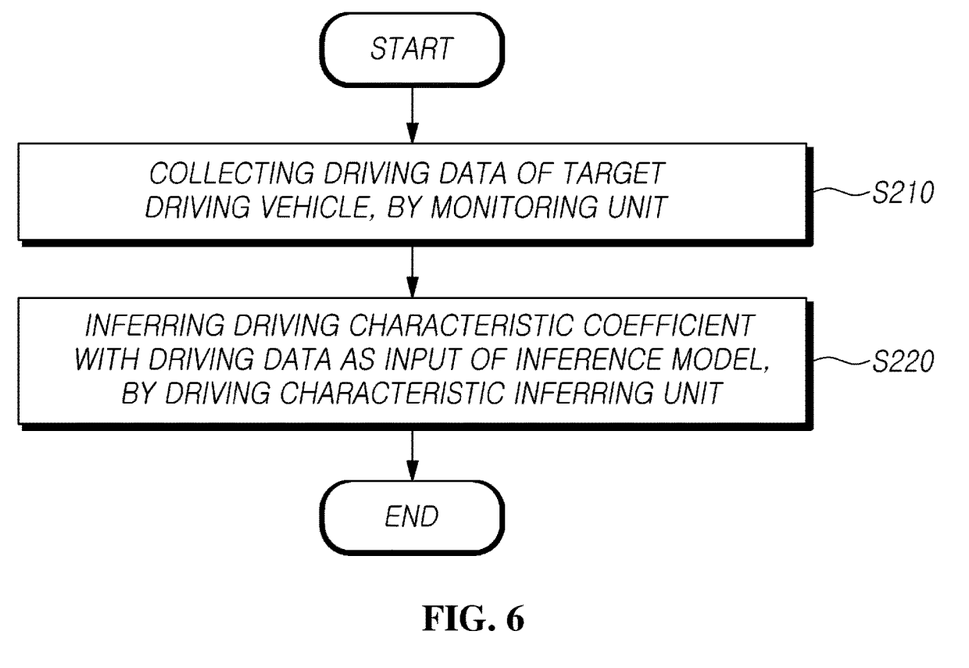
FIG. 6 is a flowchart for driving characteristic inference in an exemplary embodiment of the present disclosure.

FIG. 5 is a flowchart for model training in an exemplary embodiment of the present disclosure, and FIG. 6 is a flowchart illustrating driving characteristic inference in an exemplary embodiment of the present disclosure.

Referring to FIG. 5, the plural driving characteristic model training unit of the driving characteristic inferring apparatus trains a plural driving characteristic model based on deep reinforcement learning as in S110. That is, the plural driving characteristic model training unit trains the plural driving characteristic model with the learning driving data of the learning driving vehicle as an input, and the learning driving data may include state information and action information of the learning driving vehicle.

Specifically, the state information may include a speed of the learning driving vehicle, a located lane of the learning driving vehicle, a relative distance between the learning driving vehicle and a neighboring vehicle, and a relative speed between the learning driving vehicle and the neighboring vehicle. The action information is information regarding a running operation of the learning driving vehicle, and may include information related to the lane change and acceleration adjustment.

Next, when the dataset generating unit for every driving characteristic generates a dataset for every driving characteristic using the trained plural driving characteristic model as in S120, the real-time inference model training unit trains the inference model in real-time based on the dataset for every driving characteristic as in S130. At this time, the real-time inference model training unit may train the inference model by supervised learning.

Referring to FIG. 6, first, the monitoring unit collects driving data of the target driving vehicle as in S210. Next, the driving characteristic inferring unit infers the driving characteristic coefficient with the driving data as an input of the inference model as in S220.

As described above, the driving characteristic inferring method and apparatus according to the exemplary embodiment of the present disclosure may infer a driving characteristic coefficient using a trained inference model, and infer a driving characteristic of the target driving vehicle which is an individual object.

Further, the driving characteristic inferring method and apparatus according to the exemplary embodiment of the present disclosure may infer not only the deterministic driving characteristic, but also the stochastic driving characteristic of the target driving vehicle.

As described above, although the present invention has been described with reference to the exemplary drawings, it is obvious that the present invention is not limited by the exemplary embodiment and the drawings disclosed in the present specification and various modifications may be performed by those skilled in the art within the range of the technical sprit of the present invention. Further, although the effects of the configuration of the present invention have not been explicitly described while describing the embodiments of the present invention, it is natural that the effects predictable by the configuration should also be recognized.

The exemplary embodiment according to the present invention may be implemented by various means, for example, a hardware, a firmware, a software, and a combination thereof. When the exemplary embodiment is implemented by the hardware, one exemplary embodiment of the present invention may be implemented by one or more of application specific integrated circuits (ASICs), digital signal processors (DSPs), digital signal processing devices (DSPDs), programmable logic devices (PLDs), field programmable gate arrays (FPGAs), processes, controllers, microcontrollers, or microprocessors.

When the exemplary embodiment is implemented by the firmware or the software, the exemplary embodiment of the present invention may be implemented by a module, a procedure, or a function which performs a function or operations described above. The software code is stored in the memory to be driven by the processor. The memory is located inside or outside the processor and exchanges data with the processor, by known units.

The invention claimed is:

1. A driving characteristic inferring apparatus comprising:
   a memory and a processor;
   a monitoring unit collecting a learning driving data of a learning driving vehicle and a driving data of a target driving vehicle from at least one of a sensing module equipped in the learning driving vehicle, the target driving vehicle and a road side unit (RSU);
   a model training unit training a plural driving characteristic model and an inference model based on the learning driving data of the learning driving vehicle, the model training unit including:
      a plural driving characteristic model training unit training the plural driving characteristic model using the learning driving data,
      a dataset generating unit for all driving characteristics generating a dataset for the all driving characteristics by means of a plural characteristic model, and
      a real-time inference model training unit training the inference model in real time using the generated dataset for the all driving characteristics; and
   a driving characteristic inferring unit inferring a driving characteristic coefficient representing a driving characteristic of the target driving vehicle with the driving data of the target driving vehicle as an input of the inference model trained by the model training unit, and repeatedly updating the driving characteristic according to a predetermined cycle;
   wherein the driving characteristic inferring unit updates the driving characteristic by:
      inferring a current driving characteristic coefficient based on additional driving data collected over time by the monitoring unit,
      comparing a current driving characteristic coefficient with a previously inferred driving characteristic coefficient, and
      when the current driving characteristic coefficient is different from the previously inferred driving characteristic coefficient, updating the previously inferred driving characteristic coefficient with the current driving characteristic coefficient,
   wherein the target driving vehicle is an individual vehicle that drives within a predetermined distance from the learning driving vehicle,
   wherein the driving characteristic coefficient is a stochastic driving characteristic coefficient calculated through a KL divergence loss function to minimize a loss function and minimize a distributional distance between the inferred driving characteristic coefficient and an actual driving characteristic coefficient, and wherein the inferred driving characteristic coefficient of the target driving vehicle is used to control the learning driving vehicle.

2. The driving characteristic inferring apparatus of claim 1, wherein the driving characteristic coefficient further includes a deterministic driving characteristic coefficient.

3. The driving characteristic inferring apparatus of claim 1, wherein the learning driving data includes a speed of the learning driving vehicle, a located lane, a relative distance from a neighboring vehicle, and a relative speed from the neighboring vehicle.

4. The driving characteristic inferring apparatus of claim 1, wherein the model training unit trains the plural driving characteristic model using a reward function, and the reward function is expressed by a function of linearly combining a product of a plural dependent compensation term and a corresponding driving characteristic coefficient.

5. The driving characteristic inferring apparatus of claim 1, wherein the inference model is trained by the loss function which compares the inferred driving characteristic and the actual driving characteristic.

6. The driving characteristic inferring apparatus of claim 1, wherein the inference model includes LSTM analyzing time-series data and Feedforward analyzing a single datum to improve inference accuracy.

7. A method of inferring a driving characteristic of a vehicle using a driving characteristic inferring apparatus, the method comprising:
   collecting, by a monitoring unit, a learning driving data of a learning driving vehicle and a driving data of a target driving vehicle from at least one of a sensing module equipped in the learning driving vehicle, the target driving vehicle and a road side unit (RSU);
   training, by a model training unit, a plural driving characteristic model and an inference model based on the learning driving data of the learning driving vehicle, the model training unit including:
      a plural driving characteristic model training unit training the plural driving characteristic model using the learning driving data,
      a dataset generating unit for all driving characteristics generating a dataset for the all driving characteristics by means of a plural characteristic model, and
      a real-time inference model training unit training the inference model in real-time using the generated dataset for the all driving characteristics;
   inferring, by a driving characteristic inferring unit, a driving characteristic coefficient representing a driving characteristic of the target driving vehicle with driving data of the target driving vehicle as an input of the inference model trained by the model training unit; and
   repeatedly updating, by the driving characteristic inferring unit the driving characteristic according to a predetermined cycle,
   wherein the updating the driving characteristic includes:
      inferring a current driving characteristic coefficient based on additional driving data collected over time by the monitoring unit,
      comparing a current driving characteristic coefficient with a previously inferred driving characteristic coefficient, and
      when the current driving characteristic coefficient is different from the previously inferred driving characteristic coefficient, updating the previously inferred driving characteristic coefficient with the current driving characteristic coefficient,
   wherein the target driving vehicle is an individual vehicle that drives within a predetermined distance from the learning driving vehicle,
   wherein the driving characteristic coefficient is a stochastic driving characteristic coefficient calculated through a KL divergence loss function to minimize a loss function and minimize a distributional distance between the inferred driving characteristic coefficient and an actual driving characteristic coefficient, and
   wherein the inferred driving characteristic coefficient of the target driving vehicle is used to control the learning driving vehicle.

8. The method of claim 7, wherein the driving characteristic coefficient further includes a deterministic driving characteristic coefficient.

9. The method of claim 7, wherein the learning driving data includes a speed of the learning driving vehicle, a located lane, a relative distance from a neighboring vehicle, and a relative speed from neighboring vehicle.

10. The method of claim 7, wherein the model training unit trains the plural driving characteristic model using a reward function, and the reward function is expressed by a function of linearly combining a product of a plural dependent compensation term and a corresponding driving characteristic coefficient.

11. The method of claim 7, wherein the inference model is trained by the loss function which compares the inferred driving characteristic and the actual driving characteristic.

12. The method of claim 7, wherein the inference model includes LSTM analyzing time-series data and Feedforward analyzing a single datum to improve inference accuracy.

* * * * *